United States Patent [19]
Hurayt et al.

[11] Patent Number: 5,836,640
[45] Date of Patent: Nov. 17, 1998

[54] VEHICLE WITH EXTERIOR SUN VISOR AND SUN VISOR CONSTRUCTION

[75] Inventors: Mark S. Hurayt, Aloha; Christopher Jory, Portland; Hans-Peter Bock, Hillsboro, all of Oreg.

[73] Assignee: Freightliner Corporation, Portland, Oreg.

[21] Appl. No.: 674,838

[22] Filed: Jul. 3, 1996

[51] Int. Cl.⁶ .................................................. B62D 35/00
[52] U.S. Cl. .................... 296/180.2; 296/97.1; 296/97.9; 296/208; 296/95.1; 362/74
[58] Field of Search ............................. 296/180.1, 180.2, 296/97.1, 97.9, 95.1, 208; 362/250, 74, 432; 248/223.41, 224.7, 298.1

[56] References Cited

U.S. PATENT DOCUMENTS

| | | | |
|---|---|---|---|
| D. 153,190 | 3/1949 | Thrailkill | D12/191 |
| D. 154,735 | 8/1949 | Arbib | D12/191 |
| D. 310,652 | 9/1990 | Nagata | D12/191 |
| 1,942,225 | 1/1934 | Tibbets | 296/44 |
| 2,625,425 | 1/1953 | Foster | 296/95 |
| 2,657,089 | 10/1953 | Kaul | 296/44 |
| 3,424,490 | 1/1969 | Francis | 296/95 |
| 4,154,504 | 5/1979 | Mohs | 350/97 |
| 4,199,185 | 4/1980 | Woolcock | 296/1 S |
| 4,331,359 | 5/1982 | Sheldon | 296/146 |
| 4,426,111 | 1/1984 | Smith | 296/95 R |
| 4,722,030 | 1/1988 | Bowden | 362/69 |
| 4,726,619 | 2/1988 | Haugestad | 296/95 R |
| 4,730,913 | 3/1988 | Boothe | 350/604 |
| 4,966,404 | 10/1990 | Lund | 296/95.1 |
| 5,018,779 | 5/1991 | Lund | 296/180.1 |
| 5,130,906 | 7/1992 | Lund | 362/80.1 |
| 5,186,511 | 2/1993 | Hwang | 296/95.1 |
| 5,282,661 | 2/1994 | Arnberger | 296/27 |
| 5,522,634 | 6/1996 | Stanesic et al. | 296/95.1 |

OTHER PUBLICATIONS

Freightliner Heavy–Duty Trucks, FLD 112 Conventional brochure; published 1996 (prior art trucks).

Freightliner Business Class brochure; published 1994 (prior art trucks).

Photocopy of page from a White GMC brochure (copyright date 1992) showing a prior art truck with a sunvisor.

Photocopy of two pages from an International (Navistar) brochure showing a prior art truck with a sunvisor.

Photocopy of page from a Volvo brochure showing a truck with a sunvisor.

*Primary Examiner*—Gary C. Hoge
*Attorney, Agent, or Firm*—Klarquist Sparkman Campbell Leigh & Whinston

[57] ABSTRACT

An aerodynamically designed sun visor with side and front visor portions permit the flow of air upwardly between the vehicle and visor portions. In addition, air is also preferably permitted to exit at the rear of the side visor portion and through at least one opening provided at each side visor portion. Aerodynamically contoured front mounts may be used to couple the front visor section to the vehicle as well as to couple the side visor sections to the vehicle.

36 Claims, 8 Drawing Sheets

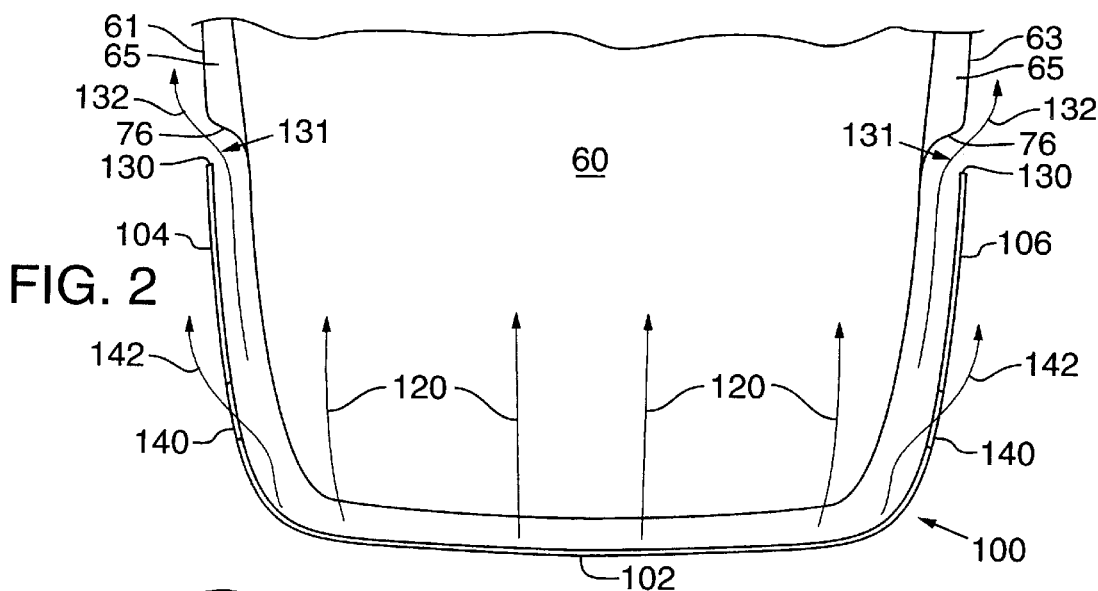
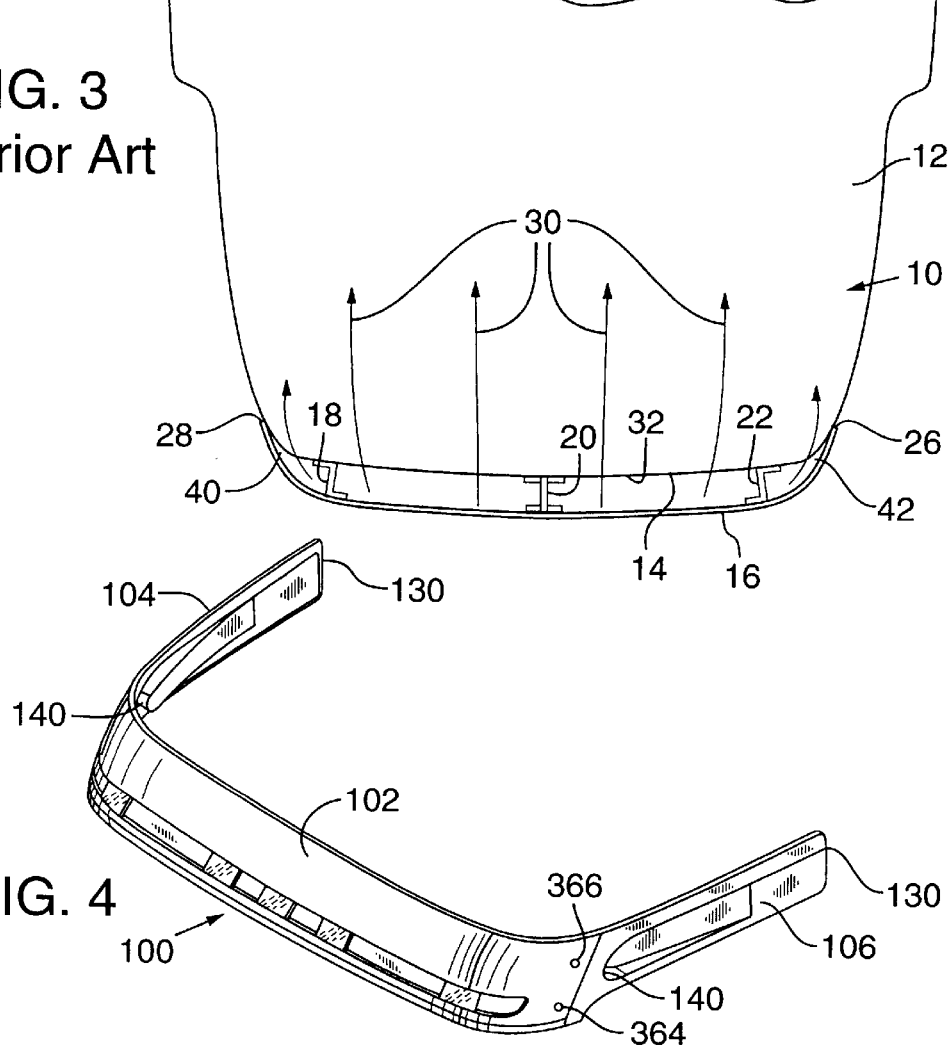
FIG. 2
FIG. 3 Prior Art
FIG. 4

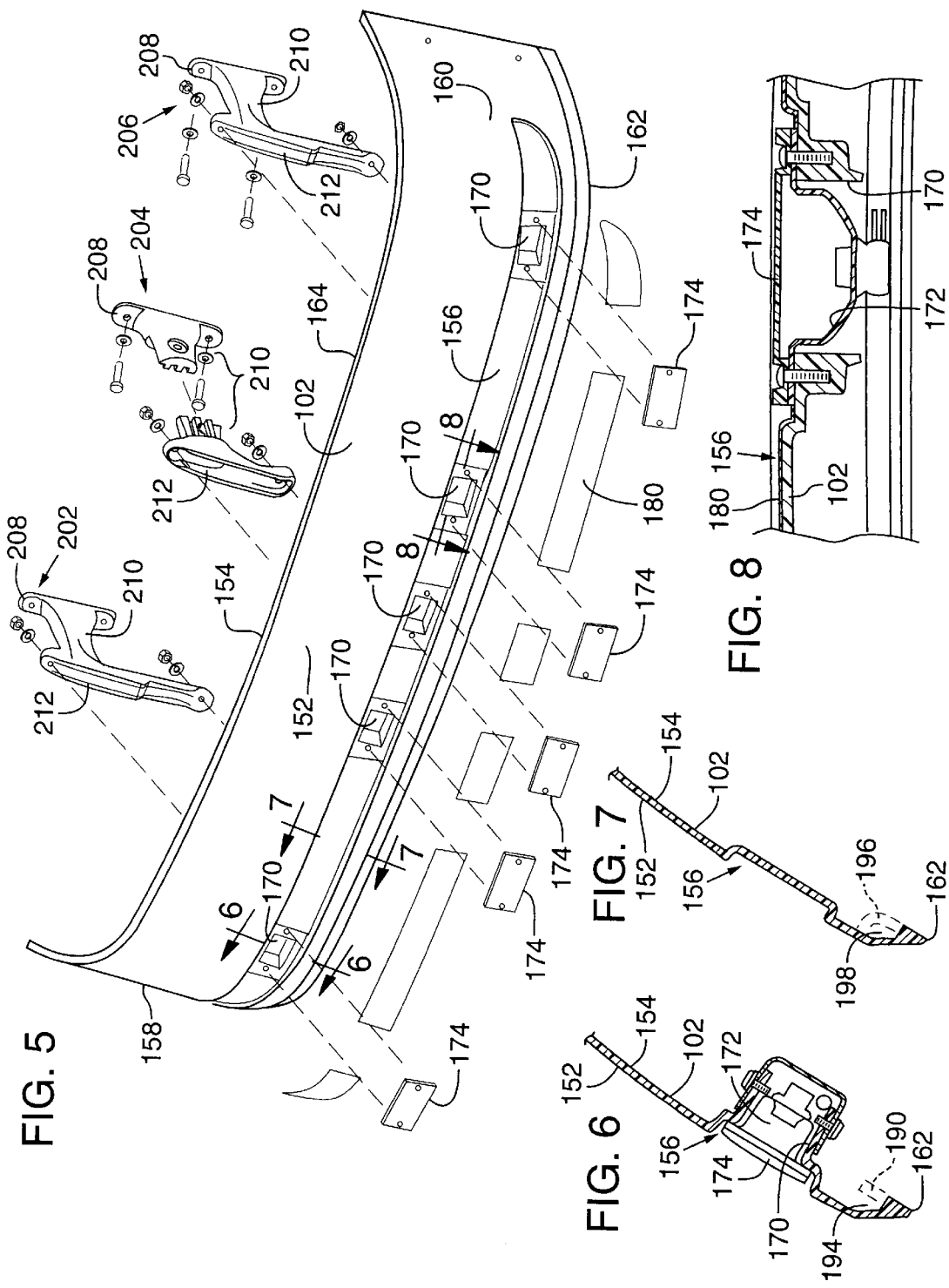

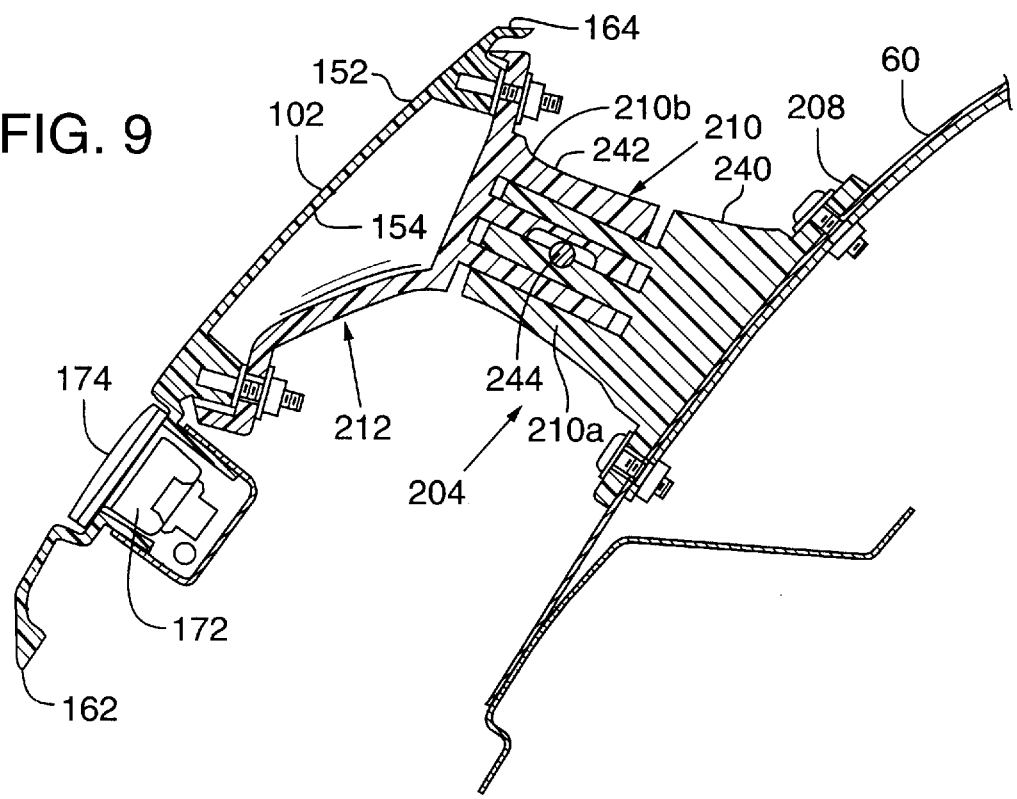
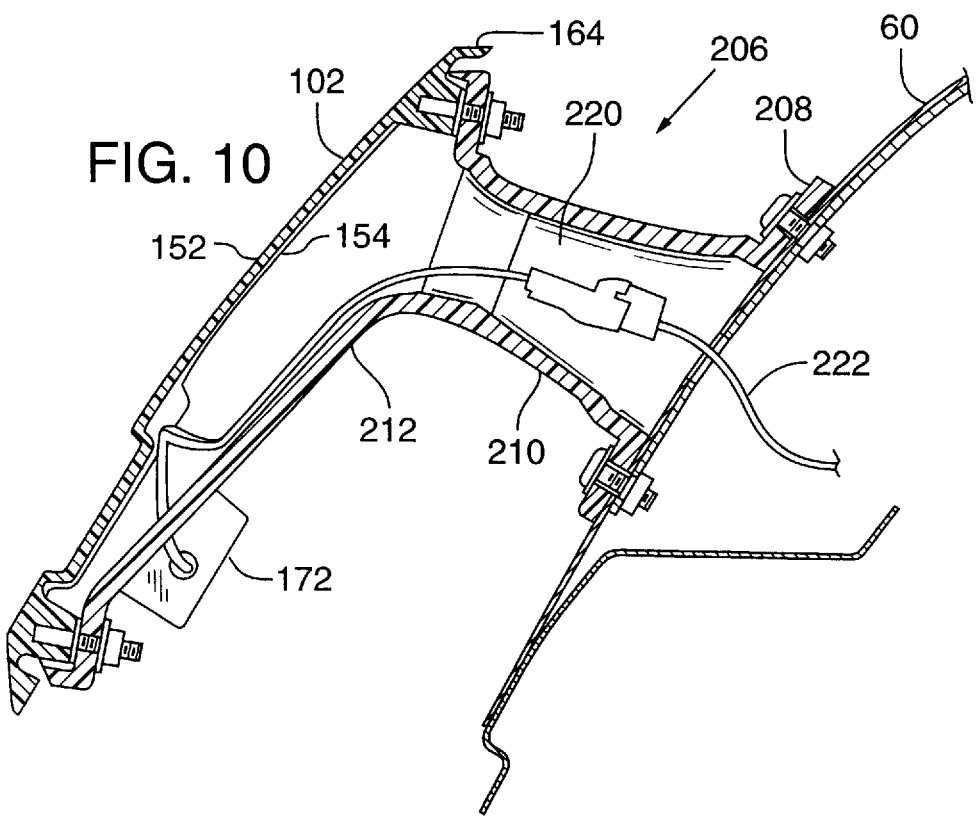

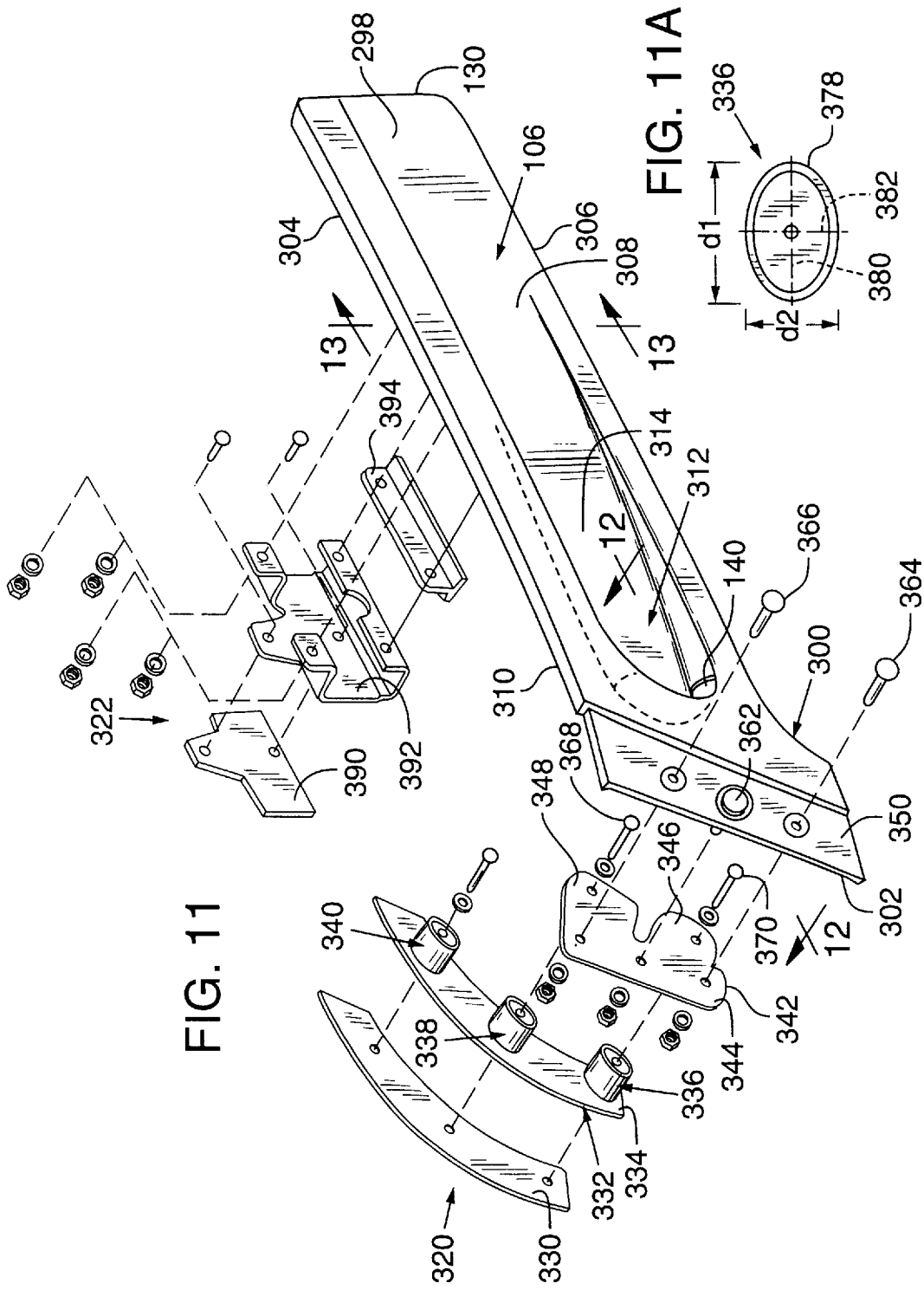

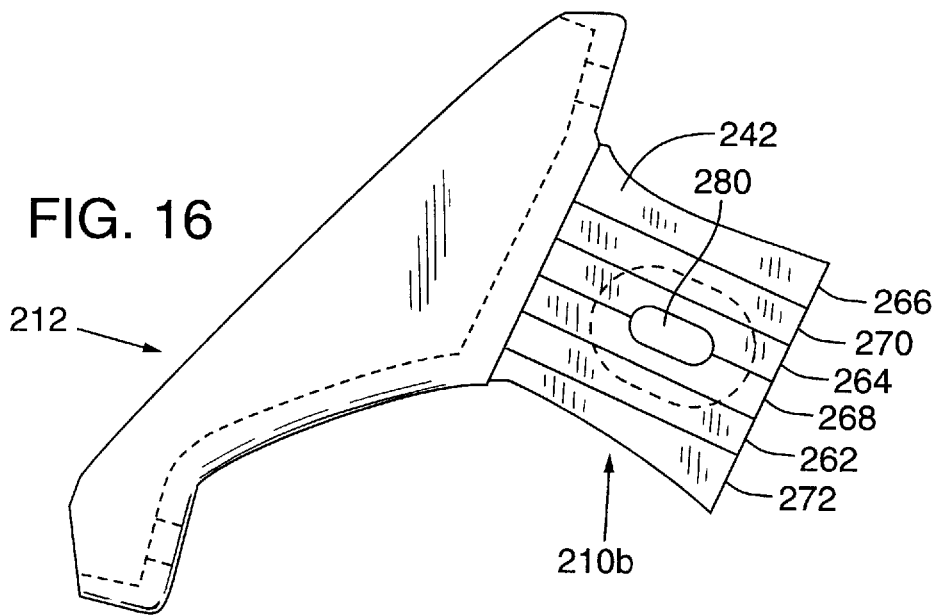
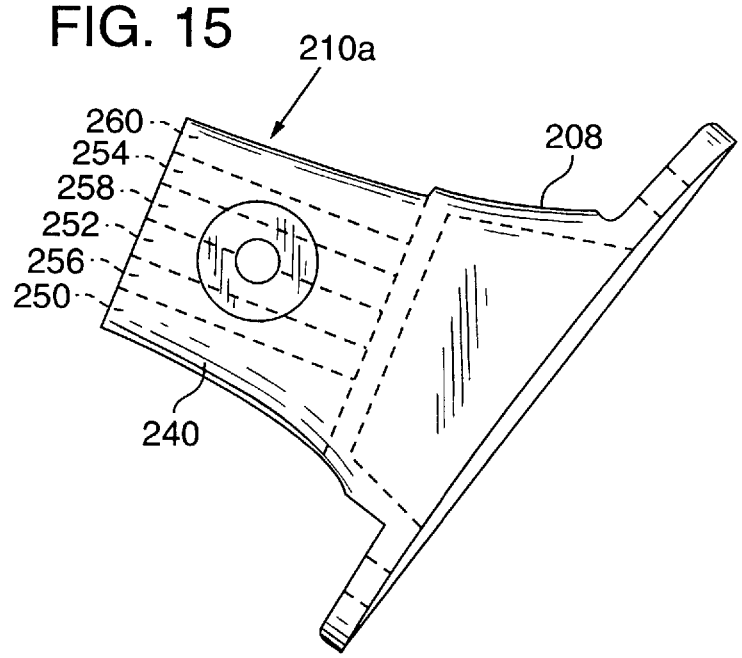

VEHICLE WITH EXTERIOR SUN VISOR AND SUN VISOR CONSTRUCTION

BACKGROUND OF THE INVENTION

The present invention relates to vehicles with exterior sun visors, that is sun visors located at the exterior of the cab or passenger compartment of the vehicle. These sun visors are particularly suitable for use on a truck.

Glare from the sun can interfere with a driver's vision and thus interfere with the safe operation of a vehicle. In addition, a driver's eyes can become fatigued and irritated by bright sunshine.

To address these problems, vehicles have heretofore been equipped with external or exterior sun visors. In one existing form, the sun visor consists of an overhanging portion of a vehicle roof which projects forwardly above the windshield of a vehicle as well as laterally so as to overhang the passenger and driver's side windows of the vehicle. This construction does provide some shielding against sunlight both at the front and sides of the vehicle. However, such a roof-overhang type sun visor is understood to increase the aerodynamic drag of the vehicle. That is, air traveling up the windshield of the vehicle impinges against the underside of the barrier formed by the overhanging roof at the front and sides of the vehicle. Also, incorporation of an overhanging sun visor portion into a roof construction adds to the cost of the roof.

FIG. 3 illustrates another type of prior art exterior sun visor for a vehicle. In this case, the vehicle 10 includes a roof 12 having a front windshield 14. A sun visor 16 is supported above the windshield of the vehicle by standoff brackets 18, 20 and 22. The side edges of sun visor 16, indicated at 26, 28 in this figure join the roof at a location rearwardly of the side edges of the windshield of the vehicle and approximately at the front corners of the vehicle roof. With this construction, air traveling along the surface of the windshield passes upwardly (as indicated by arrows 30) and between the rear surface of sun visor 16 and forward portion 32 of the roof. In this construction, at the locations 40, 42 where the respective side edges of the sun visor 16 intersect the roof, a barrier and resistance to air flow is encountered. At such locations, the aerodynamic drag is increased as the direction of air traveling toward locations 40, 42 must change at such locations in order to escape. Furthermore, the sun visor 16 of the type shown in FIG. 3 does not overhang or project outwardly above the side door windows of the vehicle and thus offers no protection against sun light entering through the driver and passenger side windows.

A need also exists for an improved mounting system for exterior sun visors. Some adjustability is provided by the mounting bracket 20 in FIG. 3. For example, bracket 20 may be formed of two sections which overlap one another and which can be shifted relative to one another to vary the extent to which the two bracket sections project outwardly from the vehicle roof. As a result, bracket 20 accommodates variations in the sun visor mounting position. Electrical wiring passing from the vehicle to lamps which may be mounted to the exterior surface of the sun visor has been hung from the exterior of brackets such as 18, 20 and 22. However, wires suspended in this manner tend to visually clutter the space between the roof and sun visor and are exposed where they are more susceptible to damage.

Although such exterior sun visors exist, a need is present for an improved vehicle with an exterior sun visor, for an improved exterior sun visor construction, and for improved mounting mechanisms for exterior sun visors.

SUMMARY OF THE INVENTION

A vehicle with an exterior or external sun visor is disclosed. The vehicle typically has a windshield and side doors. The sun visor comprises first and second side visor portions extending across the respective doors in a position above the doors so as to assist in blocking the passage of sun light through the door windows and into the interior of the vehicle cab. The sun visor also includes a front visor portion extending across or spanning the front of the vehicle. The front sun visor portion is positioned above the windshield. A plurality of mounts couple these visor portions to the vehicle in an offset manner. Thus, the major interior surfaces of these visor portions are preferably spaced from the adjoining surfaces of the vehicle. Consequently, a path is provided for air to flow upwardly along the windshield and between the vehicle and front visor portion and for air to flow between the respective side visor portions and the adjoining portions of the vehicle.

The front and side visor portions in one form comprise respective visor panel sections which are joined together in a U-shaped configuration. The end edges of the front visor portion and the front or forward end edges of the respective side visor portions may overlap one another at the location where they are joined together.

The side visor portions include opposed major interior and exterior surfaces. The interior major surface is that surface of the side visor panel which is closest to the vehicle. At least one side flow air passageway communicates from the interior surface of the side visor panel to the exterior surface of the side visor panel may also be provided. The air flow passageway is preferably provided in an air scoop which projects inwardly from the interior major surface of the side visor panel toward the vehicle. The air flow passageway may be positioned adjacent to the front edge of the side visor portion nearest the windshield. The scoop may extend from the air flow passageway toward the rear of the panel. The scoop may be recessed into the exterior major surface of the side visor panel with the depth of the recess progressively increasing in a direction from the front and toward the rear of the side visor panel.

The front visor portion may be provided with an electrical wiring receiving channel defining portion within which electrical wiring may be positioned, such wiring passing between lamps mounted to the front visor portion. In one form, the channel defining portion comprises an inwardly projecting flange which defines a wire receiving slot between the interior major surface portion of the front visor portion and the projecting flange. In another form, the channel defining portion may define a substantially enclosed wire receiving conduit through which electrical wiring passes between the lamps.

As another aspect of the present invention, the front visor portion may include an exterior surface which defines an elongated reflective material receiving recess which extends generally from side to side of the front visor portion. Lamps supported by the front visor portion are spaced at desired locations along the front visor portion. The lamps may be positioned for coverage by light covering reflective lenses positioned in the reflective material receiving recesses and over the respective lamps. In addition, reflective material may be positioned within the reflective material receiving recess. As a result, the reflective material in the recess in combination with the reflective lenses provides a reflective band extending substantially from side to side across the exterior surface of the front visor panel, thereby enhancing the visibility of the vehicle.

Most preferably, the side visor portions have rear edges which do not entirely close the air flow path between the vehicle and the side visor portions at such rear edges. In a specifically preferred form of the invention, the rear edges of the side visor panels are spaced from the adjacent surfaces of the vehicle to form a gap which permits air to flow not only upwardly between the vehicle and side edges of the side visor portions and rearwardly between the rear edges and the adjacent vehicle surfaces. Consequently, the aerodynamic drag imposed by the side visor portions on the vehicle is reduced.

The side visor portion may include rear mounts which define an air flow passageway therethrough. The side visor portions are elongated with a longitudinal axis extending generally parallel to the longitudinal axis of the vehicle. In a most preferred embodiment, the rear mount has an air flow passageway extending in a direction generally parallel to the longitudinal axis of the associated side visor portion.

As yet another aspect of the present invention, the side visor portions may each include an associated front mount which comprises a plurality of standoff spaced-apart column portions. These column portions may have a sidewall extending between the vehicle and side visor portion with an exterior surface which is smooth. The column portions are preferably of a closed, smoothly transitioning, geometric shape. In one specific form, the column portions have first and second cross-sectional dimensions extending along respective first and second perpendicular axes. The second cross-sectional dimension is preferably shorter in length than the first cross-sectional dimension. In addition, the columns are preferably oriented with second axis being generally upright and with the first axis extending generally forwardly relative to the vehicle. This orientation enhances the air flow around the column portions of the side visor panel front mount. In a specific form, the column portions are of an oval cross-section with a smooth curved sidewall.

The front visor portion also includes a plurality of front mounts supporting the front visor portion in a position spaced from the vehicle. At least one of the front mounts is hollow to define an electrical wiring receiving conduit therethrough. As a result, electrical wiring may pass through the front mount to a lamp or lamps mounted to the front visor portion of the sun visor. In addition, in the event the front visor portion includes an electrical wiring receiving channel defining portion previously mentioned, wiring may pass from the front mount along the channel defining portion to the lamps.

The front visor portion includes transversely disclosed upper and lower edges. The front mounts include a base portion coupled to the vehicle, a central stem portion projecting outwardly from the base portion, and an elongated head portion carried by the stem portion. The head portion is oriented to extend transversely across the front visor portion in a direction extending from the lower edge toward the upper edge of the front visor portion.

At least one of the front mounts may be adjustable and comprised of first and second mount sections. The mount sections may include a plurality of interlocking projections operable to permit relative movement of the mount section to adjust the length of the stem portion and thereby the position of the front visor portion at the location of the adjustable mount. The first and second mount sections may be slidably interconnected. In a specific form, the mount sections include ribs with rib receiving grooves therebetween which are oriented longitudinally along the length of the stem portions of the mount sections so as to permit relative sliding of the mount sections and thereby adjust the length of the adjustable mount.

It is accordingly an object of the present invention to provide a vehicle with an improved external sun visor.

Yet another object of the present invention is to provide an improved mount for coupling an external sun visor to a vehicle.

A further object of the present invention is to reduce the aerodynamic drag of an external sun visor for a vehicle.

A still further object of the present invention is to provide an external sun visor which shields the vehicle from sunlight at the sides of the vehicle.

The present invention relates to the above advantages, features and objects individually as well as collectively. These and other objects and features and advantages of the present invention will become apparent with reference to the drawings and following description.

BRIEF DESCRIPTION OF THE DRAWINGS

FIG. 2 is a top schematic illustration of the external sun visor of FIG. 1 and illustrating air flow path relative to the sun visor and vehicle as the vehicle moves forwardly.

FIG. 3 is a top schematic perspective view of a prior art sun visor.

FIG. 4 is a perspective view of the sun visor of FIG. 1 shown removed from the truck.

FIG. 5 is an exploded view of the front visor portion of the external sun visor of FIG. 1.

FIG. 6 is a cross-sectional view through a lamp included in the front visor portion of FIG. 1, taken along line 6—6 of FIG. 5.

FIG. 7 is a cross-sectional view of a recess formed in the front visor portion of FIG. 1, taken along line 7—7 of FIG. 5.

FIG. 8 is a horizontal sectional view through a lamp included in the front portion of the sun visor of FIG. 1, taken along lines 8—8 of FIG. 5.

FIG. 9 is a vertical sectional view taken through the center front visor mount of FIG. 5.

FIG. 10 is a vertical sectional view taken through a hollow front visor mount and showing an electrical wiring passageway extending therethrough.

FIG. 11 is an exploded view of a side visor portion of the sun visor of FIG. 1 together with one form of front and rear mounts for coupling the side visor to the vehicle.

FIG. 11A is an end view of one form of a standoff column included in the front mount for the side visor portion of FIG. 11.

FIG. 15 is a side view of one of the front mount sections of FIG. 14.

FIG. 16 is a side view of the other of the front mount sections of FIG. 14.

DETAILED DESCRIPTION OF PREFERRED EMBODIMENTS

Figure 1:
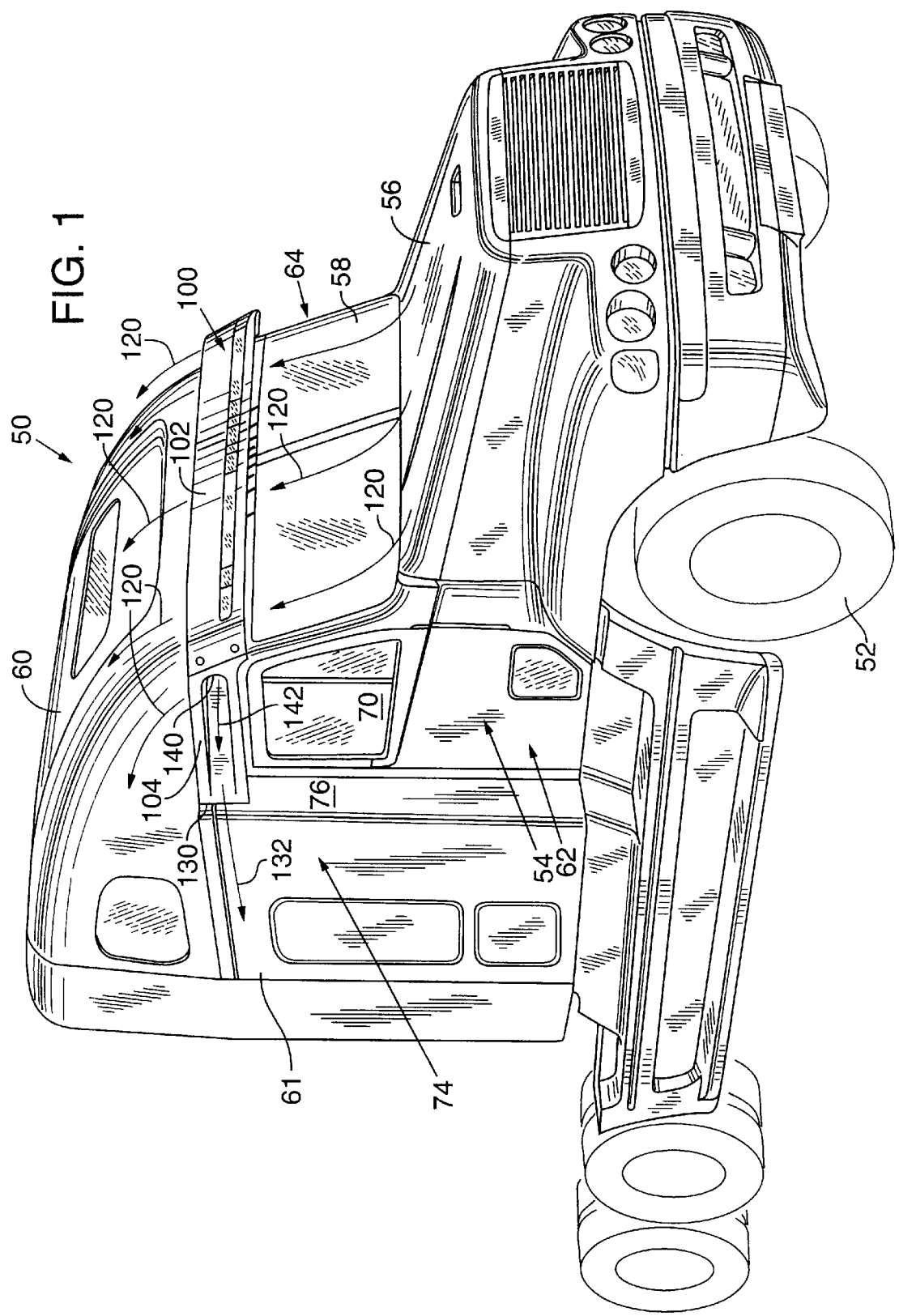
FIG. 1 is a perspective view of a truck illustrating one form of an external sun visor in accordance with the present invention mounted to the truck.

FIG. 1 illustrates a vehicle, in this case a truck 50 having a frame supported by wheels 52 and having a cab 54 supported on the frame. As can be seen in FIG. 1, the illustrated truck has a hood 56 which slopes upwardly from the front of the truck to a windshield 58. In addition, although not required, the truck 50 is of a raised or vaulted roof configuration with the roof portion of the truck being indicated at 60. First and second side doors 62, 64 allow occupants to enter the cab of the vehicle. Each of the doors includes an upper window 70, one being shown in FIG. 1. Also, the illustrated truck 50 includes a rear sleeper compartment 74 within which a bed and other amenities are typically provided for a driver and passenger of the vehicle. The illustrated truck becomes wider moving from the forward cab portion of the vehicle toward the sleeper compartment 74, as indicated by cab-to-sleeper transition region 76 (see also FIG. 2). The transition regions may assume other configurations than shown.

The truck 50 has respective sidewalls 61, 63. At the location where the sidewalls join the roof 60, the roof may be inset to form a shelf 65 which may gradually narrow moving toward the rear of the roof. This improves the aerodynamics of the truck by reducing the width of the front or leading portion of the roof. In addition, although their position may be varied, the exterior surfaces of side sun visor portions 104, 106 are spaced outwardly from the cab in the region of the truck doors and are most preferably substantially flush with or aligned with the exterior surfaces of sidewalls 61, 63 downstream from the transition regions 76. Consequently, the side sun visor portions assist in aerodynamically directing the flow of air past the transition regions and along the sides of the truck at the sidewall-to-roof transition region.

In accordance with the present invention, the FIG. 1 truck includes an external sun visor 100. The illustrated sun visor 100 includes a front visor portion 102 and respective side visor portions 104, 106 (see also FIGS. 2 and 4). As explained more fully below, the visor 100 is coupled to the vehicle with the front visor portion 102 supported above the windshield 58. The front visor portion 102 spans or extends across the front of the vehicle from side to side thereof. The illustrated side visor portions 104, 106 extend from front visor portion 102 rearwardly and in this case substantially to the transition region 76. The side visor portions are positioned above the door windows 70 and extend across the top of the door windows.

Sun visor 100 is preferably mounted to the vehicle to provide a space between the interior surfaces of the sun visor and the adjacent surfaces of the vehicle. As a result, air, indicated generally by line 120 (FIGS. 1, 2) may pass upwardly along the outer surfaces of windshield 58 and between the front visor portion 102 and the vehicle. In addition, air may pass upwardly between the side visor portions 104, 106 and the vehicle. Mounts or standoff brackets may be utilized for this purpose, although the air flow passages may be provided in other manners.

In addition, although not required, most preferably an air flow opening or passage is provided along the rear edge 130 of each side visor portion (FIGS. 1 and 2) to permit the flow of air, as indicated by arrows 132, rearwardly between the side visor portion rear edges 130 and the vehicle. Consequently, the aerodynamic drag of the side visor portion, when the vehicle is moving in a forward direction, is reduced. In the illustrated embodiment, the rear edge 130 of the side visor portion terminates short of the portion of the vehicle sidewall which forms the transition region 76. As a result, an air flow gap 131 is provided between the side visor portion rear edges 130 and the vehicle wall at these locations.

In addition, as can be seen in FIGS. 1 and 2, the side visor portions 104, 106 are preferably each provided with at least one air flow passageway 140 to permit the escape of air from the space between the interior of the side visor section and the exterior of the side visor section at such location, such as indicated by arrows 142. Although not required, these preferred air flow passageways are believed to reduce the turbulence of air flowing past the side visor portions and to thereby reduce the noise which would otherwise be generated by moving air at such locations.

Although the external sun visor of FIGS. 1, 2 and 4 is depicted with side visor portions and a front visor portion jointed together in a generally U-shaped configuration with extended side legs, it should be noted that other configurations may also be used. For example, the sun visor may be of a monolithic unitary construction. In addition, although less preferred, the side visor portions may be utilized without the front visor portion or with a front visor portion of a different configuration.

With reference to FIGS. 5–8, the illustrated front visor portion 102 has major opposed exterior and interior surfaces 152, 154. The interior major surface is the surface nearest the cab of the vehicle and the exterior surface is the surface which is exposed for viewing from the front of the vehicle. A recess 156 is provided in the exterior surface 152 and extends from a first side edge portion 158 of the front visor section 102, across the front visor section, and to a second side edge portion 160 of the front visor section. The illustrated recess 156 is optionally spaced upwardly above the lower edge 162 of the front sun visor section and nearer to the lower edge than the upper edge 164. A plurality of optional marker lamp receiving openings 170, in this case five such openings spaced apart along the recess, are provided in the front visor section. As best shown in FIGS. 6 and 8, marker lamps 172 are mounted to the front visor section 102 and are positioned respectively in these marker lamp receiving openings 170. The marker lamps include respective marker lamp lenses or covers 174. The marker lamps are mounted to the front sun visor section 102. The lens covers 174 are preferably yellow or amber in color. A band of reflective material, such as tape 180, is positioned within the recess 156. Like the lens covers 174, the tape 180, which comprises one suitable form of a reflective material, may be yellow or amber in color. Typically, the tape covers the entire recess except for the lamp openings 170. Consequently, when assembled, the tape provides a reflective band extending across substantially the entire front of sun visor portion 102 from side to side of the vehicle, thereby enhancing the visibility of the vehicle. Also, the tape, in combination with the lens covers, creates an amber or yellow band extending across the front of the sun visor.

To energize lamps 172, electrical wire (not shown in FIGS. 5–8) extends from a power source, such as batteries carried by the truck and through a control switch or switches to the lamps 172. Rather than having wires dangling where they are subject to damage and are not visually appealing, the front sun visor section 102 may be provided with an electrical wire receiving channel defining portion within which such wires may be positioned. In FIG. 6, a flange 190

(shown in dashed lines in this figure) is shown projecting upwardly at the lower edge 162 of visor section 102 and outwardly from the interior surface 154 thereof. In this case, a wire receiving slot 194 is defined between surface 154 and the flange 190. Electrical wiring may be disposed in this slot as it passes from lamp to lamp. In an alternative form, an enclosed wiring receiving conduit 198 (shown in dashed lines in FIG. 7) may be provided through which electrical lamp wires may pass. For example, as shown in FIG. 7, a flange 196 may be formed to extend upwardly from a position near the lower edge 162 of the visor section 102 and to a location along surface 154 of the visor section to define and enclose the conduit 198. The conduit or slot may also be provided by utilizing a separate component mounted to the sun visor section 102, for example, mounted to the interior surface 154 thereof.

The front visor 102 is coupled to the vehicle by a plurality of front mounts, indicated at 202, 204 and 206 in FIG. 5. Each of the mounts 202, 204 and 206 includes an enlarged base portion 208 for coupling to the vehicle, a central projecting or stem portion 210 which projects outwardly from the base 208 and a head portion 212 which is elongated. The head portion 212 is oriented in a generally upright orientation. In addition, the head portion 212 preferably extends from the lower edge portion 162 to the upper edge portion 164 of the front sun visor section 102 when these components are interconnected.

Typically, at least one of the mounts, in this case the central mount 204, is adjustable in length. That is, the illustrated mount 204 has a stem 210 which may be adjusted in length to accommodate variations in manufacturing tolerances of the front visor portion 102 and the roof 60. That is, the stem 210 may be adjusted, as described in greater detail below, to position head portion 212 against the interior surface 154 of visor section 102 with the base 208 mounted to roof 60 of the vehicle, without deflecting the visor section 102 as could be the case if a fixed length mount 204 of an improper length is used. Indented pockets or recesses (not shown) may be provided in the roof 60 to receive the bases 208 to reduce the extent to which the bases 208 project outwardly beyond the adjacent roof exterior surfaces.

The illustrated bracket 206 is shown in greater detail in FIG. 10. In this case, the front mount 206 has a hollow interior 220. Electrical wires 222 may pass through roof 60, the hollow electrical wire receiving chamber 220 and outwardly through the head 212 of mount 206 to the lamps 172. Again, in passing from lamp to lamp, electrical wires may be placed in a receiver such as the slot 194 (FIG. 6) or the conduit 198 (FIG. 7). Typically, the front mounts 202 and 206 are of the same construction.

Figure 14:
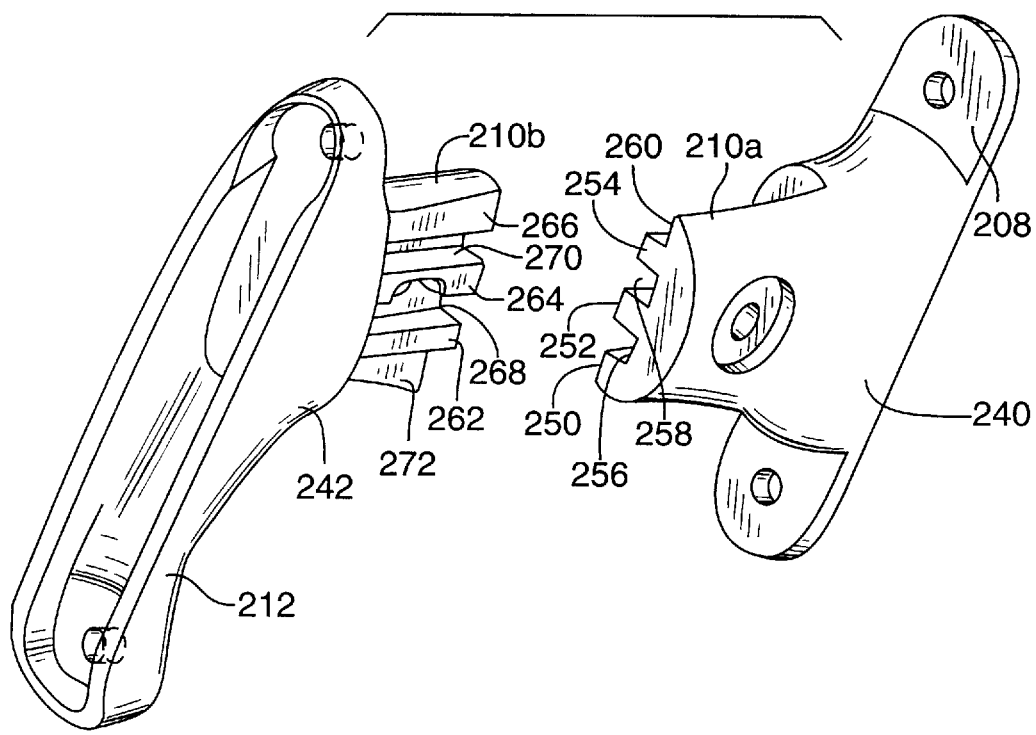
FIG. 14 is an exploded view of two front mount sections of a form used to adjustably mount the front visor to the vehicle to adjust the spacing between the front visor portion and the vehicle.

The adjustable center mount 204 is best seen in FIG. 9 and 14–16. The illustrated mount 204 includes first and second mount sections 240, 242. Mount section 240 includes the base 208 and a stem portion 210a. Mount section 242 includes the front visor supporting head portion 212 and a stem portion 210b. The sections 240, 242 interfit in an interlocking relationship in a manner that permits movement of elements 240, 242 relative to one another to vary the length of the central stem portion 210. When in the desired location, a bolt or other fastener 244 is tightened to secure the sections 240, 242 together in their desired position. As shown in FIGS. 14–16, mount section 240 most preferably includes a plurality of projecting ridges or ribs 250–254 extending longitudinally along stem section 210a. These ribs 250–254 are generally rectangular in cross-section. A rectangular groove 256 separates ribs 250, 252 and a similar groove 258 separates ribs 252, 254. In addition, a recessed shelf 260 is positioned adjacent the outer surface of stem 210a and the rib 254. In the same manner, stem section 210b is provided with elongated longitudinally extending rectangular projecting ribs 262–266. The ribs 262 and 264 are separated by a rectangular groove 268 while the ribs 264 and 266 are separated by a similar groove 270. A shelf 272 is positioned adjacent the rib 262. When the mount sections 240, 242 are interconnected, rib 250 is positioned against shelf 272, rib 252 is positioned in groove 268 and rib 254 is positioned in groove 270. Conversely, when mounted together the rib 262 is positioned in groove 256, rib 264 is positioned in groove 258, and rib 266 is positioned against shelf 260. Thus, the ribs and grooves intersect with one another in a locking fashion while still permitting longitudinal sliding (elongation and contraction of stem 210) of the sections 240, 242 relative to one another. The mount section 242 is provided with an elongated fastener receiving slot 280 which permits limited relative sliding of these mount sections relative to one another to adjust the length of the stem 210.

With reference to FIG. 11, the side sun visor sections will next be described with reference to side sun visor 106. The illustrated side sun visor section 106 comprises an elongated panel 298 which is generally of a rectangular configuration with an enlarged forward end 300. That is, the forward end portion 300 flares downwardly near the windshield portion of the vehicle so as to match the wider width of the front visor portion 102 of this illustrated construction. In addition to rear edge 130, side visor panel 298 has a front edge 302, a top edge 304, and a bottom edge 306. Preferably, side visor section 106 is of a monolithic unitary one-piece construction in the form of the panel 298. The panel 298 also includes major opposed front and rear surfaces 308, 310. The surface 310 constitutes an interior surface when the side visor section 106 is mounted. That is, the surface 310 is nearest to the adjacent vehicle surfaces while the exterior surface 308 is exposed from view when one looks at the vehicle from the side thereof. The air flow passageway 140 is positioned forwardly toward the front edge 302 of the side visor panel 298. In the illustrated configuration, the side visor panel 106 includes an air scoop 312 with the air flow passageway 140 being provided at the front forward-most and deepest portion of the air scoop. The scoop 312 is recessed into the exterior surface 308 of the side visor panel as indicated by recess 314. The scoop 312 also projects inwardly from the interior surface 310. The illustrated scoop 312 has a recess 314 having a depth which progressively decreases moving from the air flow passageway 140 toward the rear of the panel.

Figure 12:
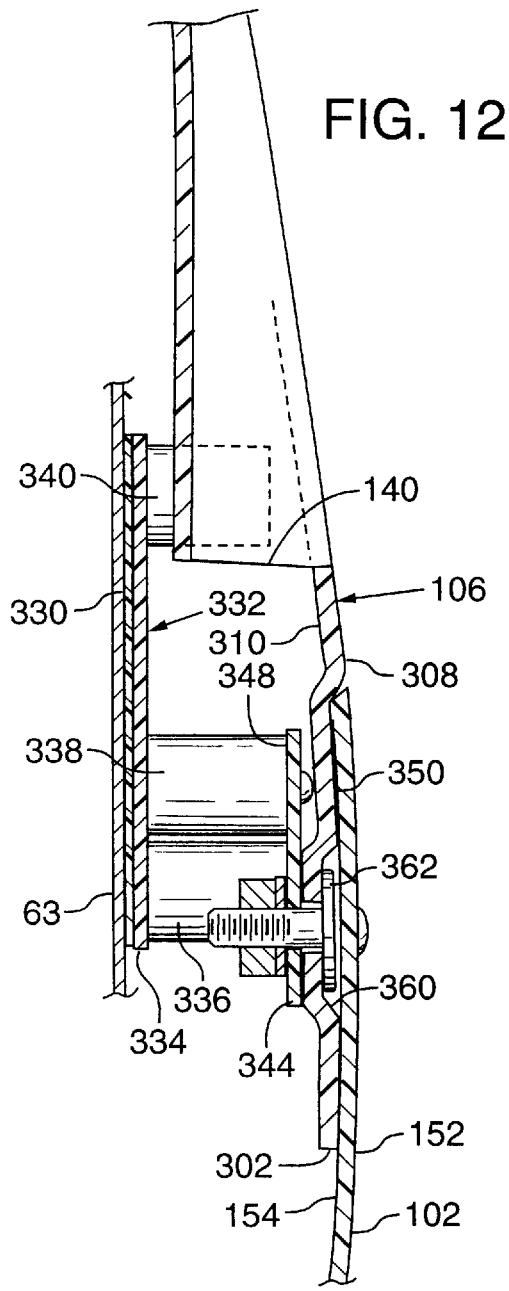
FIG. 12 is a horizontal sectional view, taken along line 12—12 of FIG. 11, showing the coupling of the side visor portion to the front visor portion of FIG. 5.
Figure 13:
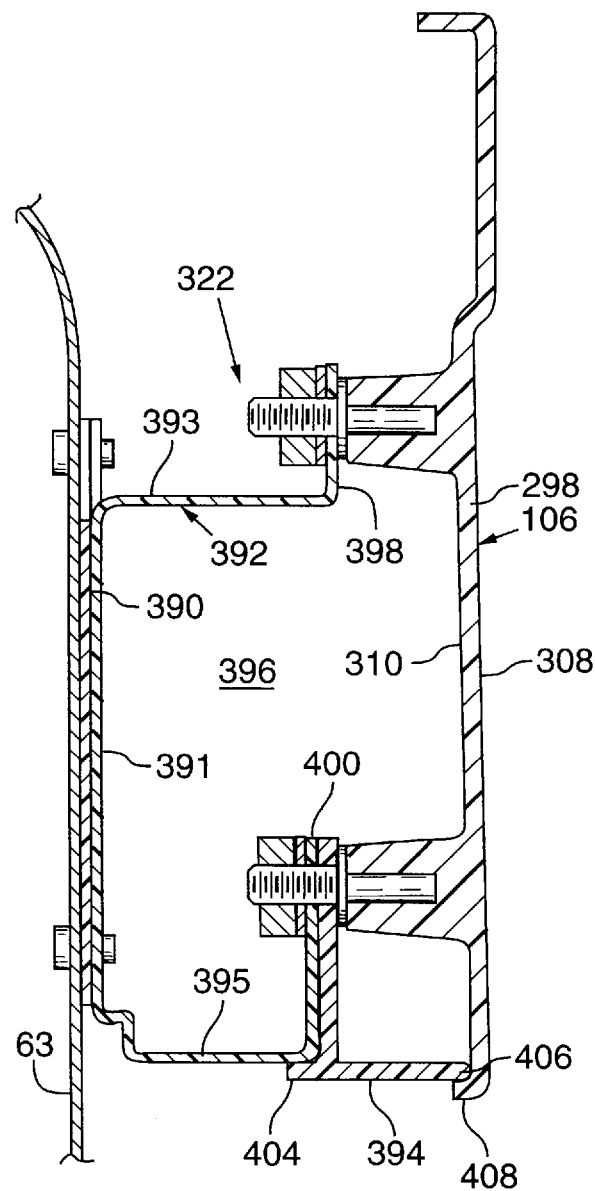
FIG. 13 is a vertical sectional view, taken along line 13—13 of FIG. 11, illustrating the coupling of the side visor panel and rear mount of FIG. 11 to the vehicle.

The side sun visor panel is mounted to the vehicle by respective front and rear mounts 320, 322 which are best shown in FIGS. 11–13.

The front mount 320 includes an arcuate spacer 330 for mounting to the vehicle surface. A standoff bracket portion 332 having a base 334 shaped like spacer 330 is also provided. A plurality of standoff portions or columns 336, 338 and 340 project outwardly from base 334 toward the interior surface 310 of the side visor panel 298. A side visor section to front visor section coupling bracket 342 is also provided. Bracket or plate 342 includes a spine portion 344 and lobe portions 346, 348 extending rearwardly (toward the rear of panel 298) from the spine portion. A plurality of fastener receiving openings are provided through these components as shown in FIG. 11. In addition, the exterior surface 310 of the side visor panel 298 is recessed, as indicated at 350, adjacent to the front edge 302 of the panel. This recess is provided to receive a corresponding portion of the front visor section 102 in an overlapping manner when these components are interconnected. As best shown in FIG. 12, the recessed or step portion 350 of the side visor panel 298 includes a fastener receiving recess 360 within which a fastener 362 is positioned to couple the front edge portion of the side visor panel to the bracket 344. The fastener 362 is concealed from view at the exterior of the vehicle when front visor portion 102 is mounted in place. The bracket 342, in combination with the fastener 362, and other fasteners 364, 366, the latter two fasteners being exposed when the front and side visor sections are interconnected, provide for a secure interconnection of these front and side visor portions 102, 106 in an overlapping relationship. In addition, fasteners 368, 370 securely couple the bracket 342 to the standoff columns 336, 338 and thus to the vehicle to provide a securely interconnected and mounted side visor section to front visor section construction.

The standoff column portions 336, 338 and 340 are aerodynamically designed to facilitate the flow of air rearwardly past these column portions and behind the side visor panel sections.

With standoff column 336 being an example, and with reference to FIG. 11A, the standoff column 336 includes a sidewall 378 which has an exterior surface of a closed smoothly transitioned geometric shape. Consequently, air easily flows across the outer surfaces of sidewall 378. In the specifically illustrated example, the column 336 has a first cross sectional dimension $d_1$ along a first axis 380 and a second cross sectional dimension $d_2$ along a second axis 382. The axis 382 is transverse to, and in this case orthogonal to, the first axis 380. The column 336, as well as columns 338 and 340, are preferably oriented with the first axis 380 generally extending forwardly relative to the longitudinal axis of the vehicle and of the panel section 298. Also, the second axis 382 generally extends in an upright direction relative to the vehicle and transverse to the panel section 298. In the specifically illustrated configuration, the standoff columns are generally oval in cross section with a smoothly curved sidewall 378.

The rear mount 322 includes a spacer 390 for mounting to the vehicle surface, a standoff bracket 392 and a support bracket 394. These brackets receive fasteners such as illustrated in FIG. 11.

As shown in FIG. 13, when these components are assembled to mount the side sun visor panels in place, an air flow passageway 396 is defined between the bracket 392 and the interior surface 310 of the side visor panel 298. Passageway 396 extends generally longitudinally relative to the longitudinal axis of the side visor panel and thereby facilitates the flow of air through the rear mount 322 toward the rear edge 130 of the panel. In addition, stable mounting of the rear portion of the panel is achieved. In particular, the bracket 392 has a base 391 with outwardly projecting spaced-apart legs 393, 395. The legs 393, 395 terminate in upwardly projecting mounting flanges 398, 400. The stability of the assembly is enhanced because the panel is mounted at upper and lower locations to the respective flanges 398, 400 of the bracket 392 to form a boxlike structure bounding the air flow passageway 398. In addition, the support bracket 394 includes a first leg or lip portion 404 which supports the bottom of leg 395 of bracket 392 and also is supported at its outer edge 406 by a lip 408 formed along the base of the side visor panel.

With the exception of brackets 330, 390 and the various fasteners which are typically of metal, the components of the sun visor 100 are preferably made of a lightweight durable material, such as a polymer material. A specific example is polybutylene teraphalate/polycarbonate with Xenoy™ from General Electric Company being a specifically preferred material. These components are typically molded.

In operation, the sun visor is mounted in place with the side visor sections and front visor sections positioned as shown in FIG. 1 along the respective sides and front of the vehicle and above the window areas of the vehicle. Air is permitted to flow upwardly between the front visor section and the vehicle as well as upwardly between the side visor sections and the vehicle. In addition, most preferably air is permitted to exit at the rear of the side visor portions 104, 106 as well as through at least one opening 140 provided in each of the side visor portions. Consequently, an aerodynamically enhanced sun visor construction is provided which shields the occupants of the vehicle from glare not only from the front of the vehicle, but also at the sides of the vehicle. In addition, the aerodynamics of the sun visor are enhanced by mounting brackets as previously described. Moreover, accommodations for electrical wiring in such mounting brackets and along the front visor portion facilitate the installation of lamps of the assembly.

Having illustrated and described the principles of our invention with reference to a preferred embodiment, it should be apparent to those of ordinary skill in the art that this invention may be modified in arrangement and detail without departing from its principles. Therefore, we claim all such modifications that fall within the scope of the following claims:

We claim:

1. A vehicle with a sun visor for a vehicle having a windshield and side doors, the sun visor comprising:

an elongated first side visor portion extending across a first door in a position above the first door, a front visor portion extending across the front of the vehicle and above the windshield, and an elongated second side visor portion extending across a second door in a position above the second door, the second door being at the side of the vehicle opposite to the side of the vehicle having a first door;

a plurality of mounts coupling the first and second side visor portions and front visor portion in an offset position from the vehicle so as to provide a path for air to flow upwardly along the windshield and between the vehicle and the front visor portion, a path for air to flow between the first side visor portion and the vehicle and a path for air to flow between the second side visor portion and the vehicle.

2. A vehicle according to claim 1 wherein the first, second and front visor portions comprise respective visor panel sections which are joined together in a U-shaped configuration, the front visor panel section having an upright front panel interior major surface adjacent to but spaced from the front of the vehicle and a front panel exterior major surface opposite to the interior manor surface, the side visor panel sections each having an upright side panel interior manor surface adjacent to but spaced from a side of the vehicle along the entire length of the side panel section and a side panel exterior surface opposite to the side panel interior surface.

3. A vehicle according to claim 2 wherein the front visor portion includes first and second side edges, the first and second side visor portions including respective front edges, wherein the first side edge of the front visor portion and front edge of the first side visor portion are positioned and joined together with their major surface in an overlapping relationship, and wherein the second side edge of the front visor portion and the front edge of the second side visor portion are positioned and joined together with their manor surfaces in an overlapping relationship.

4. A vehicle according to claim 1 wherein each of the first and second side visor portions include an interior major surface positioned adjacent to and spaced from the vehicle and an opposite exterior major surface, each of the first and second side visor portions also including at least one side air flow passageway communicating from the interior major surface of the side visor portion to the exterior manor surface of the side visor portion.

5. A vehicle according to claim 4 in which each of the first and second side visor portions include an air scoop projecting inwardly from the interior major surface toward the vehicle, the air scoops having an air inlet facing forwardly toward the front of the vehicle, the side air flow passageways thereby comprising the air scoops.

6. A vehicle according to claim 5 in which each side visor portion includes a front edge and a rear edge, the front edge being closest to the windshield of the vehicle, and an air flow passageway being defined between the rear edge of the side visor portion and the vehicle.

7. A vehicle according to claim 1 in which each side visor portion includes a front edge and a rear edge, the front edge being closest to the windshield of the vehicle, and an air flow passageway being defined between the rear edge of the side visor portion and the vehicle.

8. A vehicle according to claim 1 in which the front visor portion is generally an upright panel with an upright interior major surface positioned adjacent to the vehicle and an opposite exterior major surface portion, the front visor portion including an electrical wiring receiving channel defining portion.

9. A vehicle according to claim 8 in which the front visor portion includes a lower edge portion, the channel defining portion comprising a flange projecting upwardly along the lower edge portion of the front visor portion so as to define a wire receiving slot between the interior major surface portion and the projecting flange.

10. A vehicle according to claim 8 in which the channel defining portion defines a substantially enclosed wiring receiving conduit formed integral with the front visor portion and accessible from the interior major surface side of the front visor portion.

11. A vehicle according to claim 1 in which the front visor portion includes an exterior surface and an opposed interior surface, the exterior surface defining an elongated reflective material receiving recess extending generally from side to side of the first visor portion, the first visor portion including a plurality of reflective lens covered lights positioned in the reflective material receiving recess, and reflective material positioned within the reflective material receiving recess.

12. A vehicle according to claim 1 in which the first and second side visor portions each include an associated front mount comprising a plurality of stand off column portions projecting in a direction outwardly and away from the side of the vehicle.

13. A vehicle according to claim 12 in which the column portions each have a sidewall extending between the vehicle and side visor portion which has an exterior surface of a closed smoothly transitioned geometric shape.

14. A vehicle according to claim 12 in which said column portions have a first cross sectional dimension along a first axis and a second cross sectional dimension along a second axis transverse to the first axis, the second cross sectional dimension being less than the first cross sectional dimension, and wherein the second axis is generally upright and the first axis generally extends generally forwardly relative to the vehicle, whereby air flow around the columns is enhanced.

15. A vehicle according to claim 14 in which the column portions are of an oval cross section with a smooth curved sidewall.

16. A vehicle according to claim 1 in which the front visor portion includes a plurality of front mounts projecting forwardly and outwardly from an upright front portion of a roof of the vehicle above the vehicle windshield and coupling the front visor portion to the vehicle, at least one of said front mounts being hollow to define an electrical wiring receiving conduit therethrough.

17. A vehicle according to claim 1 in which the front visor portion includes transversely disposed upper and lower edges, the mounts comprising a plurality of at least three front mounts coupling the front visor portion to the vehicle, the front mounts including a base portion coupled to the vehicle, a central stem portion projecting outwardly from the base portion and an elongated head portion carried by the stem portion and oriented to extend transversely of the front visor portion in a direction extending from the lower edge toward the upper edge of the front visor portion, at least one of said front mounts intermediate to two of such front mounts being adjustable and comprised of first and second mount sections with a plurality of interlocking projections operable to permit relative movement of the mount sections to adjust the length of the stem portion and thereby the position of the front visor portion at the location of said at least one adjustable mount.

18. A vehicle with a sun visor for a vehicle having a windshield and side doors, the sun visor comprising:

an elongated first side visor portion extending across a first door in a position above the first door, a front visor portion extending across the front of the vehicle and above the windshield, and an elongated second side visor portion extending across a second door in a position above the second door, the second door being at the side of the vehicle opposite to the side of the vehicle having a first door;

a plurality of mounts coupling the first and second side visor portion and front visor portions and front visor portion in an offset position from the vehicle so as to provide a path for air to flow upwardly along the windshield and between the vehicle and the front visor portion, a path for air to flow between the first side visor portion and the vehicle and a path for air to flow between the second side visor portion and the vehicle; and in which the first and second side visor portions are elongated with a longitudinal axis, each of said visor portions also including an associated rear mount which defines a flow passageway therethrough in a direction generally parallel to the longitudinal axis of the associated side visor portion.

19. A vehicle according to claim 18 in which the first and second side visor portions each includes an associated front mount comprising a plurality of stand off column portions.

20. A side sun visor for mounting to a vehicle above a door of the vehicle, the side sun visor comprising:

an elongated side visor panel having first and second major opposed surfaces; and at least one air flow passageway extending between the first and second opposed major surfaces.

21. A side sun visor according to claim 20 including an air scoop projecting from one of the first and second major opposed surfaces with the air flow passageway being included in the air scoop.

22. A side sun visor according to claim 21 in which the first major surface is positioned adjacent to the vehicle when the side visor panel is mounted to the vehicle and in which the panel has upper, lower, front and rear side edges, the front edge being closest to the windshield of the vehicle when the side sun visor is mounted to the vehicle, the air flow passageway being positioned adjacent to the front edge of the side visor panel, and the scoop extending from the air flow passageway toward the rear of the panel, the scoop being recessed into the second major opposed surface and projecting from the first major surface, and wherein the depth of the recess progressively decreases in a direction toward the rear of the panel.

23. A side sun visor according to claim 22 including mounting brackets projecting outwardly from the side of the vehicle and above the elevation of the door of the vehicle when the side visor panel is mounted to the vehicle for coupling the side visor panel to the vehicle with the first major opposed surface and the upper, lower, front and rear edges of the panel being spaced from the vehicle.

24. A side sun visor according to claim 22 in which the side visor panel is wider at the front edge than at the rear edge.

25. A side sun visor according to claim 20 including mounting brackets projecting outwardly from the side of the vehicle and above the elevation of the door of the vehicle and coupling the panel to the vehicle with the first major opposed surface being spaced from the vehicle.

26. A sun visor for mounting to a vehicle comprising:

an elongated visor panel having first and second major opposed interior and exterior surfaces, the first interior major surface being positioned adjacent to the vehicle when the visor panel is mounted to the vehicle;

the sun visor including a plurality of elongated mounts projecting outwardly from the vehicle when the visor panel is mounted to the vehicle for coupling the visor panel to the vehicle with the visor panel being oriented in an upright orientation spaced from the vehicle, at least one of said mounts being hollow to define an electrical wiring passageway, whereby electrical wiring may be passed from the vehicle and through the interior of the mount.

27. A vehicle according to claim 26 which includes at least three of said mounts and wherein at least one of said mounts intermediate to two of said mounts is of an adjustable length and includes first and second mount sections with slidably interconnected projecting ribs with rib receiving grooves therebetween so as to permit relative sliding of the mount sections to adjust the length of the adjustable mount.

28. A sun visor for mounting to a vehicle having a windshield and side doors comprising:

an elongated front visor panel extending across the front of the vehicle and above the windshield when the visor panel is mounted to the vehicle;

the front visor panel having first and second major opposed interior and exterior upright surfaces, the first interior major upright surface being positioned adjacent to the vehicle so as to be exposed for view by someone looking toward the visor from a location behind the visor when the front visor panel is mounted to the vehicle; and the second upright exterior surface defining an elongated recess extending from a first position adjacent one side of the vehicle across the front visor panel and to a second position adjacent to the other side of the vehicle, a plurality of reflective light covering lenses positioned in the elongated recess at spaced apart locations and reflective material in the elongated recess and extending substantially along the entire length of the recess.

29. A vehicle with a sun visor, the vehicle having a windshield and side doors, the sun visor comprising:

a first side visor portion positioned above a first door, a front visor portion extending across the front of the vehicle and above the windshield, and a second side visor portion positioned above a second door opposite to the first door;

a plurality of mounts coupling the first and second side visor portions and front visor portion in an offset position from the vehicle so as to provide a path for air to flow upwardly along the windshield and between the vehicle and the front visor portion, a path for air to flow between the first side visor portion and the vehicle and a path for air to flow between the second side visor portion and the vehicle;

wherein the first side, second side and front visor portions comprise respective visor panel sections which are joined together in a U-shaped configuration; wherein each of the first side and second side visor portions include an interior major surface portion positioned adjacent to and spaced from the vehicle and an opposite exterior major surface, each of the first and second side visor portions also including at least one side air flow passageway communicating from the interior surface to the exterior surface of the side visor portion;

each of the first and second side visor portions include an air scoop projecting inwardly from the interior major surface toward the vehicle, the at least one side air flow passageways being provided in the air scoops; and each side visor portion including a front edge and a rear edge, the front edge being closest to the windshield of the vehicle, and wherein an air flow passageway being defined between the rear edge of the side visor portion and the vehicle.

30. A vehicle according to claim 29 wherein the front visor has an interior major surface portion positioned adjacent to the vehicle and an exposed opposite exterior major surface, the front visor portion including an electrical wiring receiving channel defining portion; and wherein the exterior surface of the front visor portion defines an elongated reflective material receiving recess extending generally from side to side of the front visor portion, the front visor portion including a plurality of reflective light covering lens positioned in the reflective material receiving recess, and reflective material positioned within the reflective material recovery recess.

31. A vehicle with a sun visor, the vehicle having a windshield and side doors, the sun visor comprising:

a first side visor portion positioned above a first door, a front visor portion extending across the front of the vehicle and above the windshield, and a second side visor portion positioned above a second door opposite to the first door;

a plurality of mounts coupling the first and second side visor portions and front visor portion in an offset position from the vehicle so as to provide a oath for air to flow upwardly along the windshield and between the vehicle and the front visor portion, a path for air to flow between the first side visor portion and the vehicle and a path for air to flow between the second side visor portion and the vehicle;

wherein the first side, second side and front visor portions comprise respective visor panel sections which are joined together in a U-shaped configuration;

wherein each of the first side and second side visor portions include an interior major surface portion positioned adjacent to and spaced from the vehicle and an opposite exterior major surface, each of the first and second side visor portions also including at least one side air flow passageway communicating from the interior surface to the exterior surface of the side visor portion;

each of the first and second side visor portions include an air scoop projecting inwardly from the interior major surface toward the vehicle, the at least one side air flow passageways being provided in the air scoops;

each side visor portion including a front edge and a rear edge, the front edge being closest to the windshield of the vehicle, and wherein an air flow passageway being defined between the rear edge of the side visor portion and the vehicle; and in which the first and second side visor portions are each elongated with a longitudinal axis, each of said side visor portions also including an associated rear mount which defines a flow passageway therethrough which extends in a direction generally parallel to the longitudinal axis of the associated side visor portion, the first and second visor portions each including an associated front mount comprising a plurality of stand off column portions, the front visor portion including a plurality of front mounts coupling the front visor portion to the vehicle, at least one of said front mounts being hollow to define an electrical wiring receiving conduit therethrough, and at least one of the front mounts being adjustable in length.

32. A vehicle comprising:

a cab having a forward portion and a rear sleeper portion which is wider than the forward portion;

the cab having sidewalls each with an exterior surface and with a transition region between the forward cab portion and sleeper cab portion;

the cab also having a roof; and side sun visor portions mounted to the forward cab portion and having exterior surfaces spaced from the forward cab portion to assist in directing air past the transition regions and along the exterior surfaces of the sleeper cab portions.

33. A vehicle according to claim 32 which includes a front visor portion extending from side to side of the vehicle and joining the side sun visor portions, and wherein each of the side visor portions comprise an upright panel having first and second opposed major surfaces and upper and lower edges.

34. A vehicle according to claim 33 including an inset shelf at each side of the roof at the location at which the roof joins the side walls.

35. A vehicle according to claim 34 in which the side sun visor portions have exterior surfaces which are substantially aligned with the exterior surfaces of the sleeper cab portion of the sidewalls.

36. A vehicle according to claim 32 in which the side sun visor portions have exterior surfaces which are substantially aligned with the exterior surfaces of the sleeper cab portion of the sidewalls.

* * * * *

UNITED STATES PATENT AND TRADEMARK OFFICE
CERTIFICATE OF CORRECTION

PATENT NO. : 5,836,640  
DATED : November 17, 1998  
INVENTOR(S) : Mark S. Hyrayt et al.

Page 1 of 1

It is certified that error appears in the above-identified patent and that said Letters Patent is hereby corrected as shown below:

Column 10,  
Lines 55 and 57, the word "manor" should be -- major --

Column 11,  
Lines 2 and 10, the word "manor" should be -- major --

Signed and Sealed this

Twenty-first Day of May, 2002

Attest:

Attesting Officer

JAMES E. ROGAN  
Director of the United States Patent and Trademark Office